March 25, 1924.

A. G. GUSTAFSON

WHEEL 1,488,340

Original Filed Oct. 22, 1917  2 Sheets-Sheet 1

Fig. A.

Witnesses:
W. F. Kilroy
Harry R. L. White

Inventor:
Andrew G. Gustafson
By Miller Chindahl Parker
Attys

March 25, 1924.

A. G. GUSTAFSON

WHEEL

Original Filed Oct. 22, 1917   2 Sheets-Sheet 2

1,488,340

Witnesses:
W. F. Kilroy
Harry R. L. White

Inventor:
Andrew G. Gustafson
By Miller Chundahl & Parker
Attys.

Patented Mar. 25, 1924.

1,488,340

UNITED STATES PATENT OFFICE.

ANDREW G. GUSTAFSON, OF AURORA, ILLINOIS.

WHEEL.

Application filed October 22, 1917, Serial No. 197,791. Renewed August 26, 1922. Serial No. 584,575.

*To all whom it may concern:*

Be it known that I, ANDREW G. GUSTAFSON, a citizen of the United States, residing at Aurora, in the county of Kane and State of Illinois, have invented certain new and useful Improvements in Wheels, of which the following is a specification.

The invention relates to wheels of the type generally known as wire wheels and which are especially adapted for use upon automobiles, aeroplanes and the like, where lightness in weight is particularly desirable; and the general object of the invention is to produce a wheel which is exceedingly practical and efficient.

More specifically, the principal object of the invention is to produce a wheel of light weight but possessing maximum strength, rigidity, and durability, and moreover which is of very simple construction and may be manufactured at a comparatively low cost.

Figure 1:
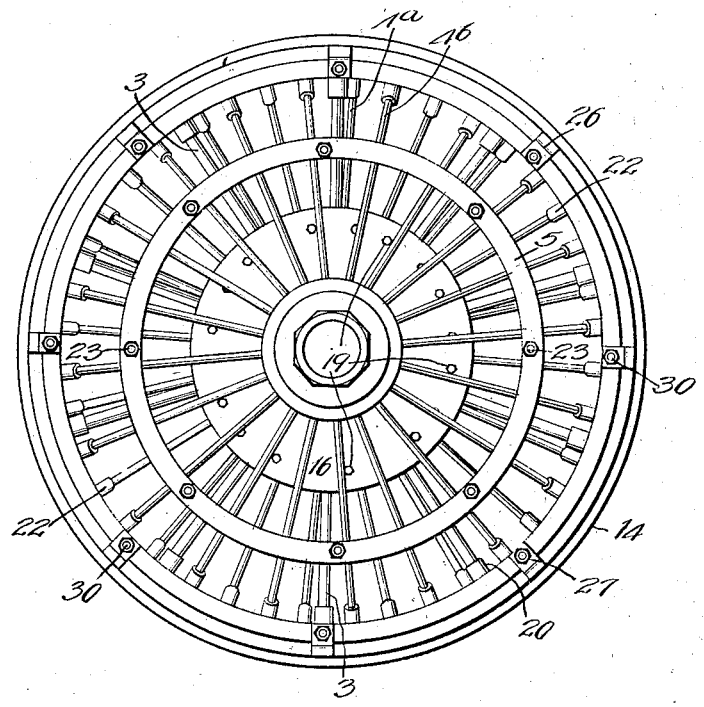
Figure 1:
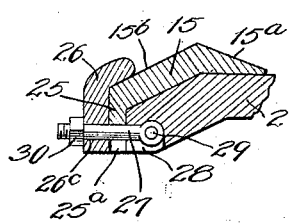
Figure 2:
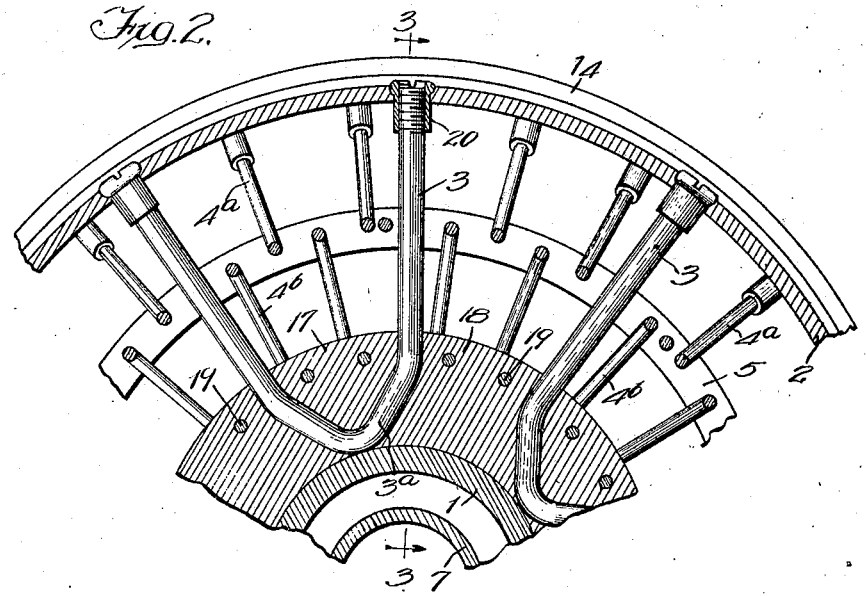
Figure 3:
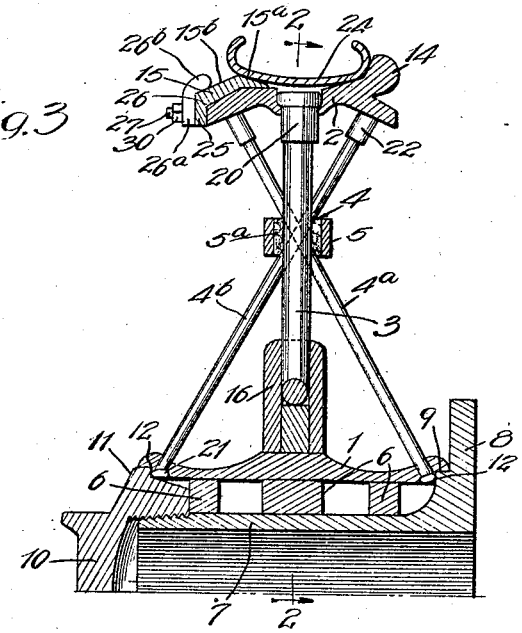

The objects of the invention thus generally stated, together with other and ancillary advantages, are attained by the construction and arrangement illustrated in the accompanying drawings forming part hereof, in which Figure 1 is a side elevation of a wheel embodying my invention. Fig. 2 is an enlarged fragmental sectional view of the wheel taken on line 2—2 of Fig. 3. Fig. 3 is a sectional view on line 3—3 Fig. 2. Fig. 4 is a sectional detail view on an enlarged scale showing a part of the demountable rim.

In the preferred embodiment of my invention, the wheel comprises a hub 1, a rim 2, central radial spokes 3 and two sets of crossing spokes 4 arranged between adjacent radial spokes and connecting the hub and rim together, and a pair of binding rings 5 clamped upon the spokes intermediate the hub and rim.

The hub 1, which may be mounted upon the axle of the vehicle in any suitable manner, is substantially cylindrical in form and spaced a short distance within the ends and in the middle thereof are internal annular supporting rings 6 suitably secured to the hub. The hub is mounted upon a bushing or sleeve 7 with the rings 6 bearing upon the outer surface of the sleeve, the inner end of which is provided with an external annular flange 8 having an annular shoulder 9 thereon upon which the adjacent or inner end of the hub is adapted to bear. The outer end of the sleeve, opposite the flange 8, is externally threaded to receive a cap 10 having an outer peripheral flange 11 upon which the adjacent or outer end of the hub bears. The rim of the cap 10 thus extends within the hub and its inner end is adapted to bear against the outer hub-supporting ring 6 when the cap is screwed onto the sleeve 7, to hold the hub in position upon the sleeve. Furthermore, the ends of the hub which engage with the sleeve and cap may, if desired, be provided at their inner edges with an angular groove or rabbet 12 to receive the shoulder 9 and flange 11 respectively, to assist in holding the hub in position when the cap is tightened upon the sleeve.

The rim 2 is formed of metal and is provided on its upper surface at its inner and outer sides with a flange 14 and a ring 15, respectively, for holding a demountable rim 24 in position on the wheel. Below said flange and ring the sides of the rim are extended outwardly from its center and preferably are inclined inwardly toward the hub of the wheel so that spokes may be readily secured thereto.

The central radial spokes 3 and the two sets of crossing spokes 4 connect the hub 1 and rim 2 together and are arranged with a view to obtaining maximum strength and rigidity. To this end the radial spokes 3 are made of substantial thickness and extend between the hub and rim in substantially the diametrical central plane of the wheel. Said spokes are preferably of dual construction, being formed in pairs by connecting the inner ends of two adjacent spokes by means of U-shaped base portions 3ª (Fig. 2). The base portions are entered between a pair of annular plates 16 suitably fixed upon the central portion of the hub and are clamped in position therebetween and between metallic filling blocks 17 and 18 by means of cap screws 19. Said blocks are entered between the plates 16 and are shaped to fill the spaces between the spokes of each pair and between adjacent pairs of spokes, and the cap screws extend through one of the plates 16 and the filling blocks and are threaded into the other plate. The outer end of each of the spokes 3 is threaded and secured to the rim by means of a screw cap 20 entered through the rim with its head countersunk in the outer periphery of the rim.

The cross spokes 4ᵃ and 4ᵇ of each set of crossing spokes 4 may be of ordinary construction and extend between the opposite ends of the hub and the opposite sides of the rim. Said spokes serve to resist lateral strains on the wheel and thus may be termed lateral spokes. The inner ends of the spokes are entered through suitable openings provided in the ends of the hub and have heads 21 bearing around the inner edges of said openings, and the outer ends of the spokes are threaded and connected to the rim by means of screw caps 22 entered through suitable openings in the inclined sides thereof. The cross spokes may be made of wire and smaller in diameter than the radial spokes, and a greater number is provided. These spokes, in addition to holding the rim against lateral strains, cooperate to resist radial strains. Furthermore, said cross spokes are spaced from each other and from the radial spokes so that the rubbing of one spoke upon another is prevented. Thus I eliminate the danger of crystallization of the metal, caused by the constant vibration and rubbing of the spokes when the wheel is in use, and the life of the spokes is thereby materially prolonged.

The binding rings 5 are clamped upon opposite sides of the spokes intermediate the hub and rim, for the purpose of holding the spokes against vibration and adding further rigidity to the wheel. Said rings are located in the transverse plane passing through the points of crossing of the spokes 4ᵃ and 4ᵇ, so that all of the spokes are engaged by the rings, and the rings are connected together by means of cap screws 23 entered through one ring and threaded into the other. Preferably a washer 5ᵃ made of felt or the like is placed between each ring and the spokes to prevent noise and abrasion.

By the peculiar arrangement of spokes thus set forth, it will be evident that efficient means are provided not only for receiving radial strains but for receiving lateral strains in opposite directions. Furthermore, the ease with which the parts are secured together will be apparent.

To facilitate the operation of placing a tire upon the wheel or removing a tire therefrom, and to overcome the necessity of carrying an entire extra wheel when it is desired to carry a reserve tire, the rim 2 is preferably adapted to support the demountable rim 24 of ordinary construction. For this purpose the retaining ring 15 is formed separate from the rim 2 and is mounted on and secured to the rim by means of a plurality of disengageable fastening devices spaced about the rim. The ring 15 is shaped so that its inner surface fits neatly upon the outer surface of the outer side of the rim 2, and is provided with a depending flange 25 which engages with the outer edge of the rim. The outer surface of said ring is provided with an inner beveled surface 15ᵃ which forms a seat for one side of the demountable rim 24 and with an outer oppositely beveled surface 15ᵇ which is adapted to be engaged by the fastening devices.

Each of the fastening devices for the ring 15 comprises an angular clamping block 26 having a lower arm 26ᵃ connected to the rim by means of a bolt 27, and an upper arm 26ᵇ bent inwardly to engage with the beveled surface 15ᵇ of the ring 15. The bolt 27 is pivoted to the rim within an open-ended slot 28 by a pivot pin 29 and is entered through an open-ended slot 25ᵃ in the flange 25 of the ring 15 and an opening 26ᶜ in the arm 26ᵃ of the clamping block. By this construction, it will be seen that the block may be readily swung upon the bolt 27 which passes through the open-ended slots in the rim and ring in the swinging movements of the block. A nut 30 on the outer end of the bolt serves to fasten the parts together upon the rim, and the parts are so proportioned and arranged that a comparatively slight loosening of the nut will permit the blocks to swing into and out of engagement with the retaining ring 15.

It will be apparent that when it is desired to remove the demountable rim and tire from the wheel it is only necessary to loosen all of the nuts 30 sufficiently to permit the clamping blocks to be swung out of engagement with the ring 15. When the blocks have thus been swung into inoperative position, the ring 15 may be readily removed and the demountable rim 24 slipped off of the rim 2. In replacing the demountable rim upon the wheel rim, the parts may be easily placed in operative position in which position they may be firmly clamped by the nuts 30 on the bolts 27 after the clamping blocks have been swung into engagement with the retaining ring.

Generic claims to the broad features of this invention are embodied in my copending application, Ser. No. 343,165 filed December 8, 1919.

I claim as my invention:

1. A wheel having, in combination, a hub, a rim, central radial and lateral cross spokes connecting the rim and hub together, all of said spokes being spaced from each other, and means clamped upon all of the spokes in the transverse plane passing through the points of crossing of the cross spokes to hold them against vibration.

2. A wheel having, in combination, a hub, a rim, radial and cross spokes connecting the rim and hub together, and a pair of rings clamped upon the opposite sides of the spokes in the transverse plane passing through the points of crossing of the cross spokes.

3. A wheel having, in combination, a hub having a pair of spaced annular plates substantially midway between its ends, a rim, radial spokes and cross spokes connecting the rim and hub together, said radial spokes being formed in pairs connected together at their inner ends and clamped between said annular plates on the hub.

4. A wheel having, in combination, a hub having a pair of spaced annular plates, a rim, radial spokes and cross spokes connecting the rim and hub together, said radial spokes being formed in pairs connected together at their inner ends, blocks entered between said annular plates in the spaces between the spokes of each pair and between adjacent pairs of radial spokes, and means for clamping said radial spokes and blocks between said annular plates.

5. A wheel having, in combination, a sleeve, a hub, supporting rings spaced a short distance within the opposite ends of the hub and bearing on the sleeve, a rim, spokes connecting the rim to opposite ends of the hub, said sleeve having an outer peripheral flange on one end, and a cap screwed onto the sleeve and holding the hub in position thereon between the cap and said peripheral flange.

In testimony whereof, I have hereunto set my hand.

ANDREW G. GUSTAFSON.